United States Patent
Bona et al.

(10) Patent No.: US 8,628,017 B2
(45) Date of Patent: Jan. 14, 2014

(54) CARD WITH ILLUMINATED CODES FOR USE IN SECURE TRANSACTIONS

(71) Applicant: X-Card Holdings, LLC, Frazer, PA (US)

(72) Inventors: John Kenneth Bona, York, PA (US); Rune Petter Domsten, Broenshoej (NO); Finn Nielsen, Copenhagen (DK)

(73) Assignee: X-Card Holdings, LLC, West Chester, PA (US)

( * ) Notice: Subject to any disclaimer, the term of this patent is extended or adjusted under 35 U.S.C. 154(b) by 0 days.

(21) Appl. No.: 13/796,827

(22) Filed: Mar. 12, 2013

(65) Prior Publication Data

US 2013/0191281 A1    Jul. 25, 2013

Related U.S. Application Data (63) Continuation of application No. 12/762,518, filed on Apr. 19, 2010, now Pat. No. 8,413,894.

(60) Provisional application No. 61/258,255, filed on Nov. 5, 2009.

(51) Int. Cl.
*G06K 19/00* (2006.01)

(52) U.S. Cl.
USPC .......................... 235/487; 235/380; 235/492

(58) Field of Classification Search
USPC .......................................... 235/380, 487, 492
See application file for complete search history.

(56) References Cited

U.S. PATENT DOCUMENTS

| | | | |
|---|---|---|---|
| 3,531,626 A | 9/1970 | Olff et al. | |
| 5,857,079 A | 1/1999 | Claus et al. | |
| 7,044,394 B2 | 5/2006 | Brown | |
| 7,584,153 B2 | 9/2009 | Brown et al. | |
| 8,413,894 B2 * | 4/2013 | Bona et al. | 235/380 |
| 2002/0070279 A1 | 6/2002 | Zausner | |
| 2003/0191945 A1 | 10/2003 | Keech | |
| 2003/0216997 A1 | 11/2003 | Cohen | |
| 2006/0227523 A1 | 10/2006 | Pennaz et al. | |
| 2007/0136211 A1 | 6/2007 | Brown et al. | |
| 2007/0277044 A1 | 11/2007 | Graf et al. | |

(Continued)

FOREIGN PATENT DOCUMENTS

WO    WO2008/061234 A2    5/2008

OTHER PUBLICATIONS

Kingbright, Preliminary Spec., 1.6×8mm SMD Chip LED Lamp (0.25mm Height), Part No. APG1608SURKC/T, Spec No. DSA15960, Rev. No. 2, Mar. 30, 2009, pp. 1-5.

(Continued)

*Primary Examiner* — Kristy A Haupt
(74) *Attorney, Agent, or Firm* — Duane Morris LLP (57) ABSTRACT

A card for use in secure transactions includes a card body having a first major surface and a second major surface, the first major surface having a combination of a plurality of symbols disposed thereon. The card body has a plurality of LEDs disposed in connection with the plurality of preprinted symbols, individual ones of LEDs being disposed to identify respective individual ones of the plurality of symbols when illuminated. An LED controller is coupled to the plurality of LEDs and operable upon actuation to selectively illuminate individual ones of the plurality of LEDs to identify a subcombination of the plurality of symbols, thereby providing an illuminated one-time code for use in a secure transaction.

20 Claims, 7 Drawing Sheets

(56) References Cited

U.S. PATENT DOCUMENTS

| | | |
|---|---|---|
| 2007/0290049 A1 | 12/2007 | Ratcliffe |
| 2008/0054077 A1 | 3/2008 | Zellner et al. |
| 2008/0065555 A1 | 3/2008 | Mullen |
| 2008/0087721 A1 | 4/2008 | Van Breemen et al. |
| 2008/0296367 A1 | 12/2008 | Parkinson |
| 2009/0159697 A1 | 6/2009 | Mullen et al. |
| 2009/0159709 A1 | 6/2009 | Mullen |
| 2009/0159712 A1 | 6/2009 | Mullen et al. |
| 2009/0199004 A1 | 8/2009 | Krawczewicz et al. |
| 2009/0277968 A1 | 11/2009 | Walker |
| 2010/0140358 A1 | 6/2010 | Couck |

OTHER PUBLICATIONS

SunLED Preliminary Spec., Part No. XZMDKT53W-6, 1.6×8mm SMD Chip LED Lamp (0.25mm Height), Drawing No. XDSB2151 V.1, Jun. 4, 2008, pp. 1-4.

QSecure, Inc. "Shifting the Anti-Fraud Paradigm: A Revolutionary Way to Secure the Credit Card Magstripe Without Changing the Acceptance Infrastructure," Dec. 2007, pp. 1-7.

International Search Report and Written Opinion dated Dec. 17, 2010 from International Application No. PCT/US10/55388.

* cited by examiner

CARD WITH ILLUMINATED CODES FOR USE IN SECURE TRANSACTIONS

CROSS-REFERENCE TO RELATED APPLICATIONS

This application is a continuation of U.S. patent application Ser. No. 12/762,518 filed Apr. 19, 2010, now U.S. Pat. No. 8,413,894, which claims priority to U.S. Provisional Patent Application No. 61/258,255 entitled "Secure Smart Card and System" filed Nov. 5, 2009, the entirety of which are hereby incorporated by reference herein.

FIELD OF THE INVENTION

The present invention relates to plastic cards, and more specifically to powered plastic cards for use in secure transactions.

BACKGROUND OF THE INVENTION

Plastic card transactions come in the two general forms: "card present" and "card-not-present" transactions. An example of a card present transaction is providing a credit or debit card to a merchant at a point of sale device while purchasing any item. Examples of card-not-present transactions are e-commerce web sites, mail order, and telephone orders transactions.

Plastic card fraud has become a significant issue not only in the United States but also worldwide. Fraud levels can be measured in the tens of billions of dollars each year or higher when the various stakeholders that are involved in the losses associated with fraudulent transactions measure their total costs. A merchant loses not only the revenue and profit related to a sale, but the product itself, and possibly higher transaction fees when fraud occurs frequently in its business. A merchant must also incur the costs associated with investigating certain types of fraudulent transactions. Credit card associations like the VISA® and MASTERCARD® associations cover some costs associated with fraud but the credit card issuers incur significantly more costs, including costs associated with refunding the amounts charged to a card holder account, investigating possible fraudulent transactions and issuing new plastic cards if a significant breach of security has been identified. When the total costs of fraud are measured among all the parties involved in financial transactions, the losses are staggering.

Plastic card fraud has also opened up a market for all sorts of fraud detection and educational services. Neural network software to detect and hopefully prevent a fraudulent transaction from occurring costs card issuers and their processors millions of dollars to operate. Educational seminars to teach card issuers, merchants, and card holders on how to better safeguard the information that can be used to commit identity theft and plastic card fraud also cost card issuers millions of dollars. Existing security standards, like the Payment Card Industry (PCI) Data Security Standard, while being excellent network and system security practices also require merchants to take extra measures to safeguard the information they possess and these measures cost merchants millions of dollars to implement. An entire industry has been created to protect the static data used in today's plastic card transactions. All told, billions are spent and still fraud levels continue to increase. These increases are due not only to defective security; rather, plastic card programs continue to utilize static data that, if obtained, can be used to commit plastic card fraud.

Over the years, the industry has continued to layer additional static data on credit, debit, and ATM transaction cards. Pin numbers and card security codes have been implemented to help address specific issues of security but criminals continue to adapt their schemes to steal this information. Current plastic cards and payment processes have heavy reliance on static security codes. The Card Verification Value (CVV) code is a three digit number contained on the magnetic stripe and the Card Security Code (CSC) is a three or four digit number printed either on the front (American Express) or the back of a plastic card. The CSC is also referred to as the CVV2, CSC2, or CID code depending on the card association related to the issued plastic card. The CVV was meant to be a hidden value for authenticating that the card is valid during "card present" transactions. The CSC is a security code used for "card-not-present" transactions to prove the card is in the hands of the card holder.

The problem with these codes is that they are static. Thieves have found numerous ways to obtain the values and either create cloned plastic cards or use the information to make fraudulent online transactions. Millions of card numbers have been stolen as a result of card skimming and large scale data thefts have compromised hundreds of millions of credit card accounts. This information has also been obtained by Internet "phishing" and "pharming" attacks.

The plastic card industry has focused on preventing the use of the static code data rather than adopting a means of implementing some level of dynamic information into these transactions.

One Time Passwords (OTP) have been in use for access control applications for a number of years and provide a level of security by allowing dynamic data to be included in accessing physical and logical assets and by providing for multi-factor authentication.

An improved and more cost-effective solution for preventing plastic card fraud is desired. An improved and more-cost effective OTP card is also desired.

SUMMARY OF THE INVENTION

A card for use in secure transactions includes a card body having a first major surface and a second major surface, the first major surface having a combination of a plurality of symbols disposed thereon. The card body has a plurality of LEDs disposed in connection with the plurality of preprinted symbols, individual ones of LEDs being disposed to identify respective individual ones of the plurality of symbols when illuminated. An LED controller is coupled to the plurality of LEDs and operable upon actuation to selectively illuminate individual ones of the plurality of LEDs to identify a sub-combination of the plurality of symbols, thereby providing an illuminated one-time code for use in a secure transaction.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling (whether physical or electrical) and the like, such as "connected" and "interconnected," refer to a relationship wherein structures are secured or attached to one another, or electrically communicate with one another, either directly or indirectly through intervening structures, as well as both movable or rigid attachments or relationships, unless expressly described otherwise.

Figure 1A:
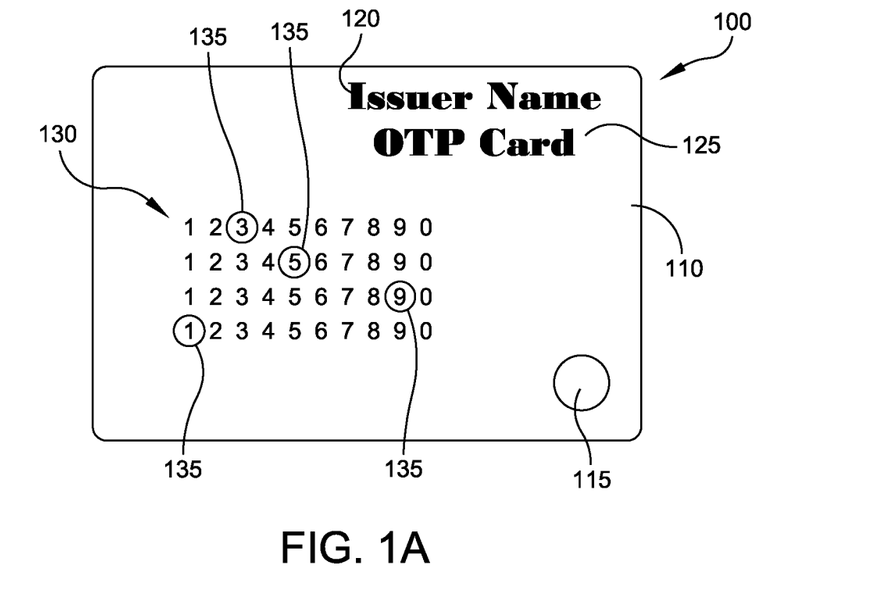
FIGS. 1A and 1B illustrate an embodiment of a one-time-password token card.
Figure 1B:
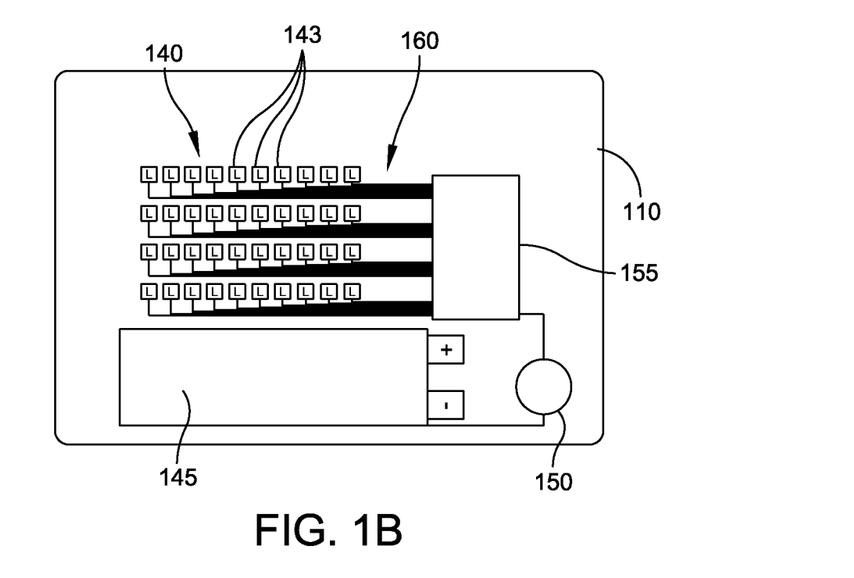

FIGS. 1A and 1B illustrate an embodiment of a one-time password (OTP) card 100, such as for use in physical or logical access control applications. The OTP card 100 can be used as a token for providing a piece of dynamic information for verification purposes in connection with a transaction (e.g., obtaining or accessing tickets or boarding passes, etc.), access to secure or sensitive information (e.g., account access, access to medical records, making stock trades, transferring money, etc.), access to secure resources (e.g., network access), access to buildings, or other activity that requires a form of user authentication with or without the use of other authentication/identification information (e.g., username and password). The OTP card 100 includes a card body 110, which in embodiments is a three-ply card body formed by conventional hot lamination techniques. FIG. 1A shows the outer front major surface of the card body 110. FIG. 1B illustrates the central insert ply having operational components. The rear outer major surface is not shown. The card body 110 optionally has the name 120 of an issuer of the card printed on the face of the card 100 along with some indicia 125 that the card is an OTP-type card. Other written indicia, such as the card holder's name, can also be provided on the front or rear outer major surfaces of the card body 110. Of particular note, the card body 110 includes an activation button 115 for manually activating the card and a grid, array or matrix 130 of values preprinted (e.g., printed with an ink, embossed, etched or otherwise permanently displayed) on the face of the card 100. In the illustrated embodiment, the values are arranged as four rows of numeric values 0 through 9, though it should be understood that numbers, alphabetic characters, or other characters or combinations thereof (collectively referred to herein as "symbols") may be used in certain embodiments.

As shown in FIG. 1, certain numbers 135 (i.e., number "3" from matrix row 1; number "5" from matrix row 2; number "9" from matrix row 3; and number "1" from matrix row 4) are circled. The circles around these numbers 135 illustrate that these numbers are illuminated at the given moment in some fashion. Upon activation of the card 100 using activation button 115, a combination of the numbers from the matrix 130 is temporarily illuminated—for example one from each row—to provide a one-time code. So, in FIG. 1, the code "3591" is illuminated for the user, when read from top to bottom. The code is dynamic, meaning the next time the activation button is pressed, a new combination of the matrix elements is illustrated, and thus a new code, is displayed. This code can be used in any application where an OTP code is required.

It should be understood that in order to visually identify a particular combination of printed digits on the face of the card it is not a requirement that the actual digit be illuminated. Rather, some area or feature proximate to the digit can be illuminated to visually identify the digit. For example, a line underneath a digit can be illuminated to show that that particular digit is part of the one time code, or a circle around a number could be illuminated. The particular manner of illumination is not important as long as the card can unequivocally display to the user the one time code relative to a preprinted matrix of possible digits.

As noted above, FIG. 1B illustrates the operable components of the OTP card 100. The card 100 includes a battery 145 for providing power to the various operable components of the card 100. Suitable long life batteries for the low power requirements are available. In particular embodiments, the internal power source is a thin film battery, such as the FLEXION™ ultra-thin, flexible lithium polymer battery available from Solicore, Inc. or a lithium thin-film battery available from Varta Microbattery GmbH. The card 100 may include a solar panel (not shown) having solar cells for extending the life of the card beyond that of a conventional battery and/or to recharge the battery.

The card 100 includes a switch 150 that is triggered by the activation button 115 and operably connected to, or between, one or both of the battery 145 and LED controller 155. A matrix of LEDs 140 is connected to the LED controller 155 by connection paths/circuitry 160. In a simplest embodiment, an individual respective wire or trace connection is formed between each LED 143 in LED matrix 140 and the LED controller 155. Each LED 143 is positioned with respect to (e.g., underneath or adjacent to) an individual numeric element/symbol in the matrix 130 to illuminate that respective element. Examples of commercially available LEDs appropriate for card 100 include, by way of example only, InGaAlP LEDs available from SunLED Corporation of Walnut, Calif. (product no. XZMDKT53W-6) and from KingBright Corporation of City of Industry, Calif. (product no. APG1608SURKC/T). When the activation button 115 is depressed, switch 150 is triggered to allow power to be applied to the LED controller 155 from the battery 145. LED controller 155 then executes a process to generate a code corresponding to individual positions in the numeric matrix 130, for example one position from each row in the numeric matrix 130. By way of example, the LED controller algorithm may generate the value 3591, which indicates row 1, position 3; row 2, position 5; row 3, position 9; and row 4, position 1. The LED controller 155 then provides power to the proper combination of lines from connection circuitry 160 to turn on the four LEDs 143 from LED matrix 140 corresponding to those positions. The illuminated LEDs illuminate the corresponding positions of matrix 130, thereby displaying a code ("3591" in FIG. 1) to the user for use as an OTP token value. This OTP value is then used (i.e., provided to a web interface, provided over the phone, etc.) in a multi-factor authentication procedure, such as may be used in on-line banking. The first factor is what the user knows, typically a username, password and/or answers to specific questions. The OTP value provides the second factor, a "what the user has" factor. This is a good method of security because the user cannot gain access to the resource (e.g., account) without physically being in possession of the token.

The illuminated values can be verified by a back end system used in the particular application, which operates the same process within the LED controller 155 to generate a code for comparison with the provided OTP for authentication or verification purposes. When the expected value is the same as the value passed or presented by the user, the card is assumed to be valid and the transaction can proceed.

Table 1.0 below illustrates an element list that may be prestored on the card 100, e.g., in the memory of the LED controller 155, for generating codes for illumination upon each actuation of the card 100.

TABLE 1.0

| Element | Row 1 | Row 2 | Row 3 | Row 4 | Next | Previous |
|---------|-------|-------|-------|-------|------|----------|
| 1 | 3 | 5 | 9 | 1 | 2 | 0 |
| 2 | 4 | 2 | 6 | 4 | 3 | 1 |
| 3 | 5 | 1 | 7 | 9 | 4 | 2 |
| 4 | 3 | 1 | 4 | 9 | 5 | 3 |
| 5 | 6 | 7 | 1 | 6 | 6 | 4 |
| 6 | 7 | 0 | 2 | 8 | 7 | 5 |
| ... | ... | ... | ... | ... | ... | ... |
| n | 2 | 9 | 5 | n | null | n − 1 |

In the illustrated embodiment, the table includes "n" rows of elements and is structured as a linked list. A linked list is a data structure that consists of a sequence of data records such that in each record there is a field that contains a reference (i.e., a link) to the next record in the sequence. A double linked list also includes a reference (i.e., a link) to the previous record in the sequence as well. The list is illustrated as a double-linked list. Columns labeled Row 1 to Row 4 includes data elements corresponding to the aforementioned matrix positions. So, for example, table row 1 has the values 3, 5, 9 and 1 corresponding to matrix positions 3, 5, 9 and 1 in rows one to 4, respectively, of matrix 130. The table includes "Next" and "Previous" links. The LED controller maintains a pointer value that points to a table element. If the point value is "2" for example, then the LED controller knows from the Next and Previous data the last table element (i.e., element 1) that was used and next table element that should be used (i.e., element 3).

For validating a received code, the back end system can have some tolerance built in. That is, though the back-end system may believe, for example, that a given card's pointer value is presently at 10, the back-end system may be programmed to validate the code if the received code value is found within +/−5 data elements in the linked list (or some other value that is acceptable for security purposes). This allows the card pointer and the pointer that is maintained by the back-end system to be slightly out-of-sync. This tolerance helps take into account the possibility for inadvertent or unused card activations.

A prestored list of matrix position values that can be used to derive a code works well for smaller scale applications, such as where there are 25,000 or fewer users. However, for larger scale applications, such as for use in connection with billions of cards (e.g., the credit card industry), then the back end storage requirements for maintaining billions of lists of matrix position values for deriving codes for verification against received OTP values/codes may be prohibitive. For these larger scale applications, the LED controller 155 can utilize any number of well known algorithms for generating a code based on some seed value(s). The back-end system can run the same algorithm using the same seed value(s) in order to verify a received code.

It should be appreciated that instead of a multi-row matrix as shown in FIG. 1A, a single row could be provided. In this embodiment, the LED controller 1A can programmed to sequentially illuminate the various positions to provide the code. For example, in row 1, the "3" could be illuminated, followed in time (such as a 1-2 seconds later), followed by the "5", etc.

Figure 2:
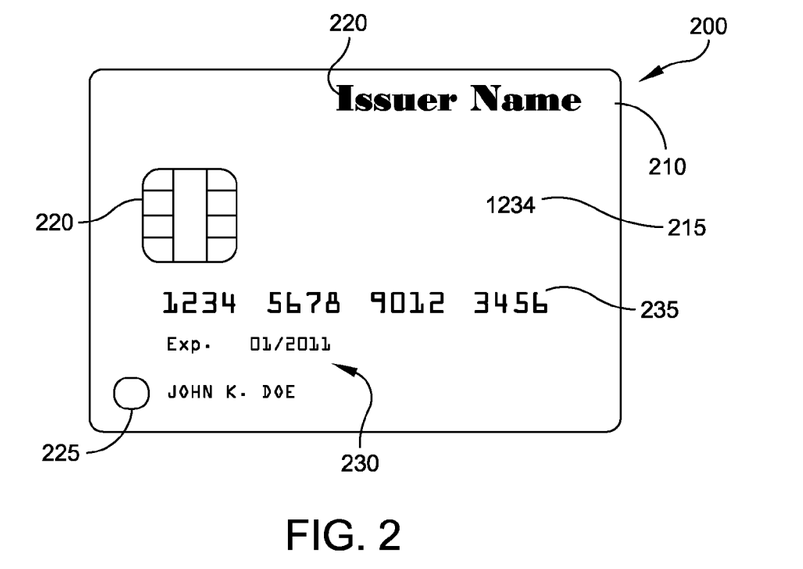
FIGS. 2 to 2E illustrate a credit or debit transaction card having one-time-password functionality for card present or card-not-present transactions.
Figure 2A:
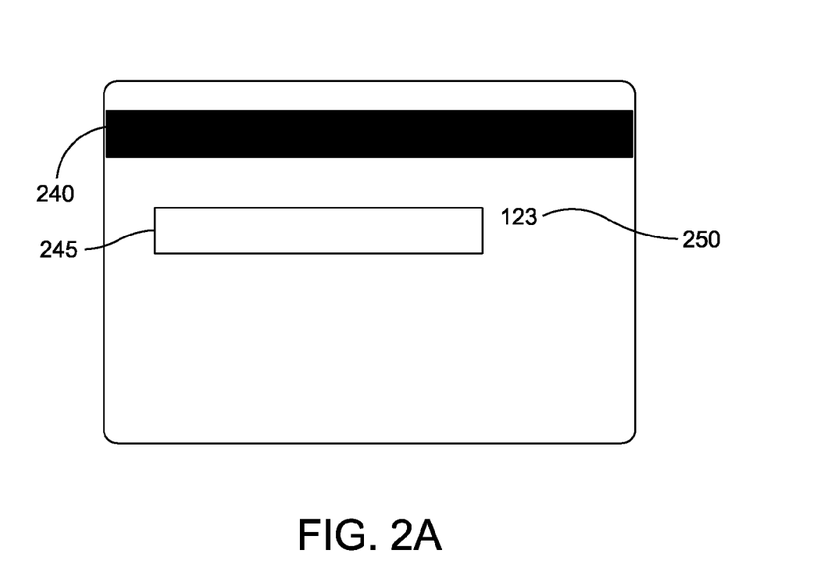
Figure 2B:
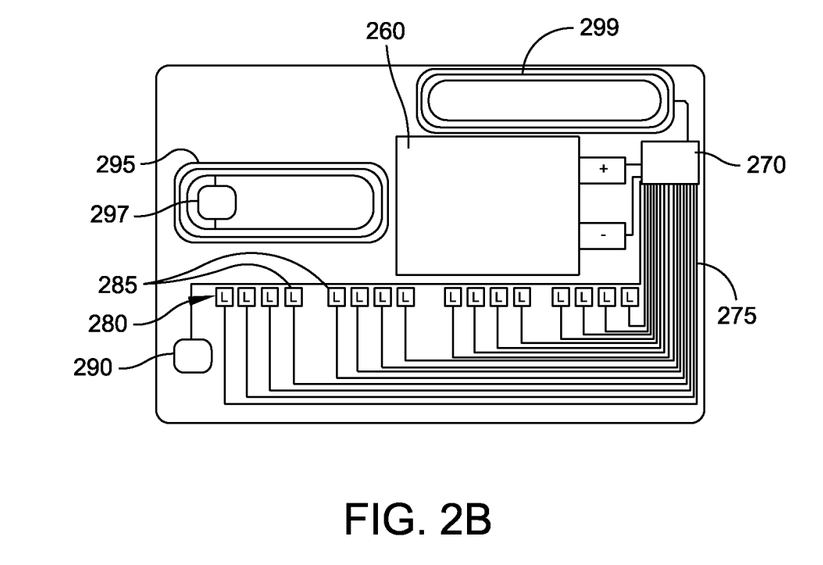
Figure 2C:
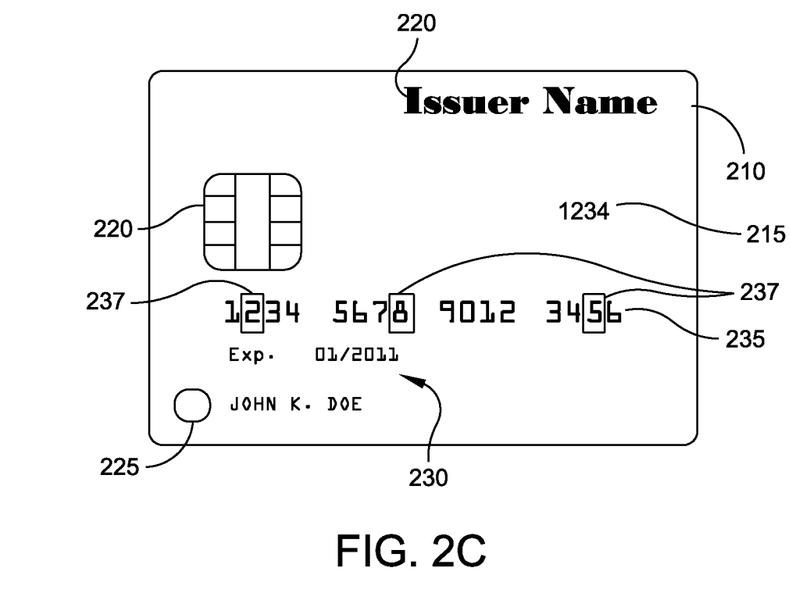

FIGS. 2 to 2E illustrate an embodiment where the LED-lit preprinted numbers (or other symbols) are incorporated into a financial transaction card 200 such as a credit or debit card. The term "credit" as used herein covers both credit transactions such as Visa® or MasterCard® transactions and charge transactions such as American Express® transactions. In embodiments, the transaction card 200 can provided improved security for both card present and card-not-present types of transactions. FIG. 2 shows the outer front major surface of card body 210 of transaction card 200. FIG. 2A shows the outer rear major surface of the card body 210. FIG. 2B shows the internal operable components of the transaction card 200. Finally, FIG. 2C shows the outer front major surface of the transaction card with digits of a primary account number (PAN) illuminated to show a dynamic code.

Referring again to FIG. 2, the face of the card body 210 can include an issuer name or other graphic typically shown on today's transactions cards. A CSC code 215 (if the card is an American Express® card) may be printed on the front face of the card, or rear face (code 250 in FIG. 2A), though this static value can be phased out as legacy systems go off-line. A primary account number 235 (ISO/IEC 7811-3 Region 1) is also printed on the cover of the card, and contains anywhere from 12 to 19 digits. American Express® cards typically have 15 digits whereas Visa® or MasterCard® cards typically have 16 digits. ISO/IEC 7811-3 Region 2 includes identifying indicia 230, such as the card holder's name and the expiration date of the card printed on the face of the card. As with the card 100 of FIG. 1, the card 200 includes an actuation button 225. The transaction card preferably has the shape of a standard magnetic stripe card, as governed by applicable standards. If a magnetic stripe emulator is used as discussed below, the rear surface shown in FIG. 2A does not actually include a magnetic stripe. A static magnetic stripe encoded with standard data in standard data formats is provided on the rear surface of the card, as shown in FIG. 2A. Signature block 245 and CSC code 250 are also shown on the rear graphics layer of the card body.

The transaction card can optionally include smart card technology for contact or contactless smart card transactions. If the card 200 is configured to be usable in smart card transactions, the card body 210 includes a smart card contact pad 220 on the front face of the card for contact-based communications between an embedded smart card chip 297 (FIG. 2B) and a smart card reader. Smart card contact pad 220 is used to perform transactions on devices supporting the ISO/IEC 7816 standards. In Europe and in Canada this would include the Chip & Pin devices used to perform payment transactions. Contact smart cards are also common in physical access control systems.

Turning to FIG. 2B, the card 200 includes an internal power source 260, such as a battery, for providing power to the various operable components of the smart card 200. If configured to be used as a smart card, the card 200 includes a conventional smart card chip/processor 297 that communicates with an appropriately configured external smart card reader by way of the aforementioned smart card contact pad 220 or wirelessly by way of integrated antenna 295 (i.e., contactless communication).

The smart card 200 also includes a one dimension LED matrix 280 including a plurality of individual LEDs 285 connected to a controller 270 via connection circuitry 275 (e.g., wires/traces). The controller 270 can be an ASIC processor. Controller 270 is connected to a second antenna 299 for use in programming the controller 270. In an alternative embodiment, the same antenna can be used for both smart card chip/processor 297 and LED controller 270 if permitted by applicable card security standards.

In conventional (static) magnetic strips, the data is permanently magnetically presented to a credit card reader using a so-called F2F-format, or two frequency format, in which a "0" bit is formed by a magnet part of a predetermined length in the magnetic strip, and a "1" bit is two longitudinally, magnetically oppositely directed magnet parts, having a combined length equal to the length of the "0" bit magnet part. Current specifications call for the magnetic stripe to be located 0.223 inches (5.66 mm) from the edge of the card, and to be 0.375 inches (9.52 mm) wide. Each track is 0.110 inches (2.79 mm) wide.

As described above for OTP card 100, when the activation button 225 is manually depressed by a user, a switch 290 is triggered to prompt controller 270 to perform its operations. Specifically, the controller generates or retrieves a position value corresponding to a combination of LEDs 285 that are to be illuminated. The LEDs 285 are positioned with respect to (e.g., underneath, adjacent to, around, etc.) individual numbers from the primary account number 235 printed on the face of the card body 210. After the controller generates or retrieves the positional values, the controller through connection circuitry 275 triggers selected individual LEDs 285 to light up based on the positional values. For example, as shown in FIG. 2C, the primary account number 235 has sixteen individual digits/positions each capable of being illuminated by a respective LED 285. In FIG. 2C, reference number 237 illustrates the numbers that are illuminated. As can be seen in FIG. 2C, the controller 270 has triggered the LEDs 285 corresponding to the second, eighth and fifteenth digits/positions of the primary account number. Whatever number happens to be printed at those locations—here, "2", "8" and "5"—are illuminated. When read in a predetermined manner by the user, e.g., from left to right, the illuminated numbers form a code "285" that can be used by the user in a given card-not-present transaction rather than the static CVC code 215 or 250. Alternatively, selected positions in the PAN can be illuminated in timed, sequential order to provided the code, in the manner described above. The code could even be used in card present transactions if the charge procedures provide for the exchange of such information as part of the transaction.

For smaller scale applications, the controller 270 may use a prestored list of position values to determine which digit positions in the primary account number 235 should be illuminated. Table 2.0 illustrated one such example for a three digit code. Four digits would be used for AMEX applications.

TABLE 2.0

| Element | PAN Position 1 | PAN Position 2 | PAN Position 3 | Next | Previous |
|---|---|---|---|---|---|
| 1 | 2 | 5 | 7 | 2 | 0 |
| 2 | 5 | 6 | 11 | 3 | 1 |
| 3 | 1 | 4 | 8 | 4 | 2 |
| 4 | 4 | 5 | 6 | 5 | 3 |
| 5 | 4 | 6 | 8 | 6 | 4 |
| 6 | 6 | 7 | 13 | 7 | 5 |
| ... | ... | ... | ... | ... | ... |
| n | 1 | 15 | 16 | null | n − 1 |

TABLE 2.0-continued

In embodiments, Positions 1, 2 and 3 could be limited by fixed length regions of the primary account number or not at all. For example, assuming a 16 digit account numbers, Position 1 could be limited to primary account number region digits 1-5, Position 2 could be limited to primary account number region digits 6-10, and Position 3 could be limited to primary account number region digits 11-16. As an alternative, to increase code possibilities in this same example, Position 1 could be limited to primary account number region digits 1-5, Position 2 could be limited to primary account number region digits 1-10, and Position 3 could be limited to any primary account number region digit, i.e., digits 1-16.

The card issuer or their processing provider would store the doubly linked list for the authentication process for use in deriving a code to validate the incoming dynamic code. A doubly linked list allows the process to use the next and previous elements in the list for verification since out of sequence transactions should be supported.

Figure 2D:
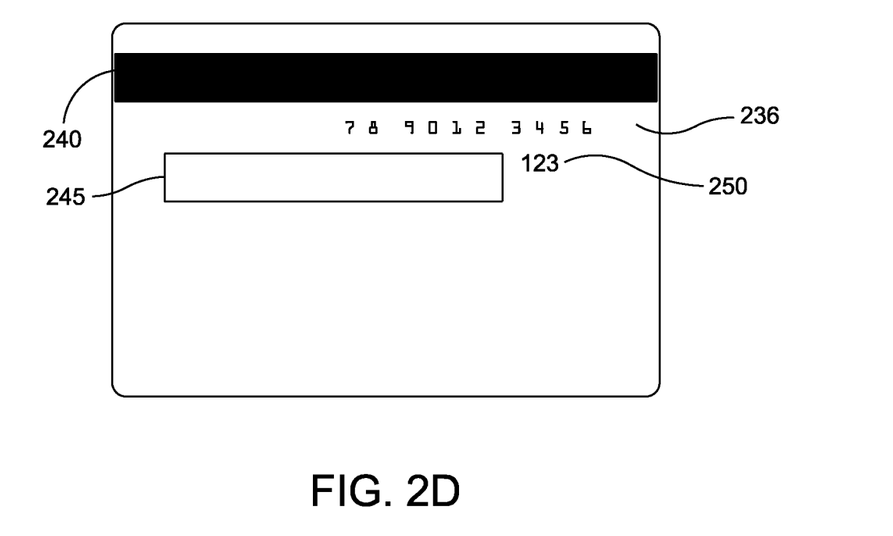
Figure 2E:
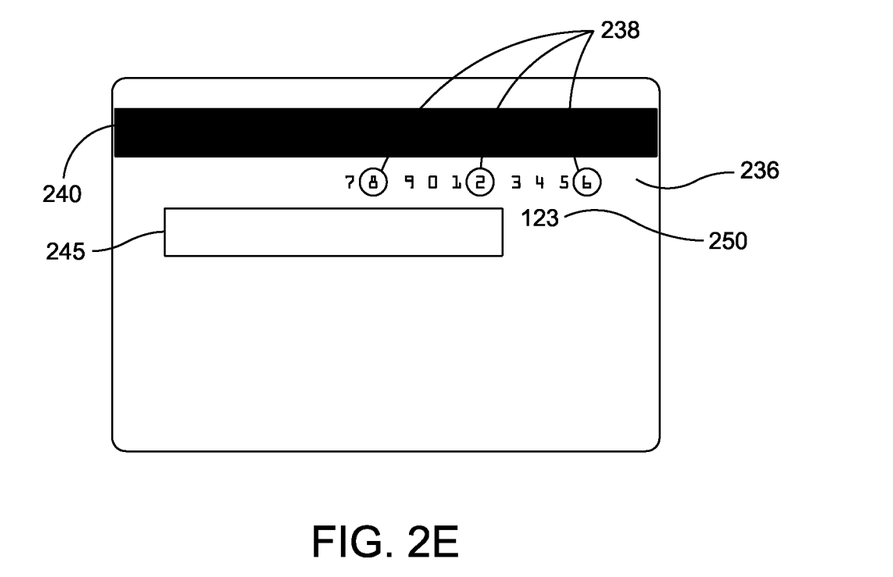

It should be understood that in lieu of illuminating digits in the primary account number, a matrix of other numbers, letters, characters or symbols could be printed on the card face for use, similar to the OTP card 100 described above. The use of the PAN, however, provides space savings on the face of the card when compared to such an approach. An embodiment where space is allocated on the rear major surface of the transaction card between the signature area 245 and magnetic stripe 240 for the matrix as shown in FIGS. 2D and 2E. These figures show a symbol matrix 236. FIG. 2E shows various positions 238 in the matrix 236 illuminated during user to provide a one time code ("826") during use. This approach, which has symbols on the rear major surface of the card for illumination, may be a utilized, for example, when the PAN on the front major surface is embossed into the card.

For larger scale applications, such as for use in connection with billions of cards (e.g., the credit card industry), the back end storage requirements for maintaining billions of lists of codes for verifying received codes may be prohibitive. For these larger scale applications, the controller 270 can utilize any algorithm that will provide an appropriate level of security while being implementable in a microcontroller of reasonable memory size, in a commercially reasonably speed (i.e., in a limited number of processing steps) and at an appropriate cost. By way of example, both the controller 270 could use one or more seed values, one or more of which may be incremented with each transaction, in calculating matrix position values for each transaction. The back-end system uses the same algorithm and seed value(s) in order to verify a received code.

Figure 3:
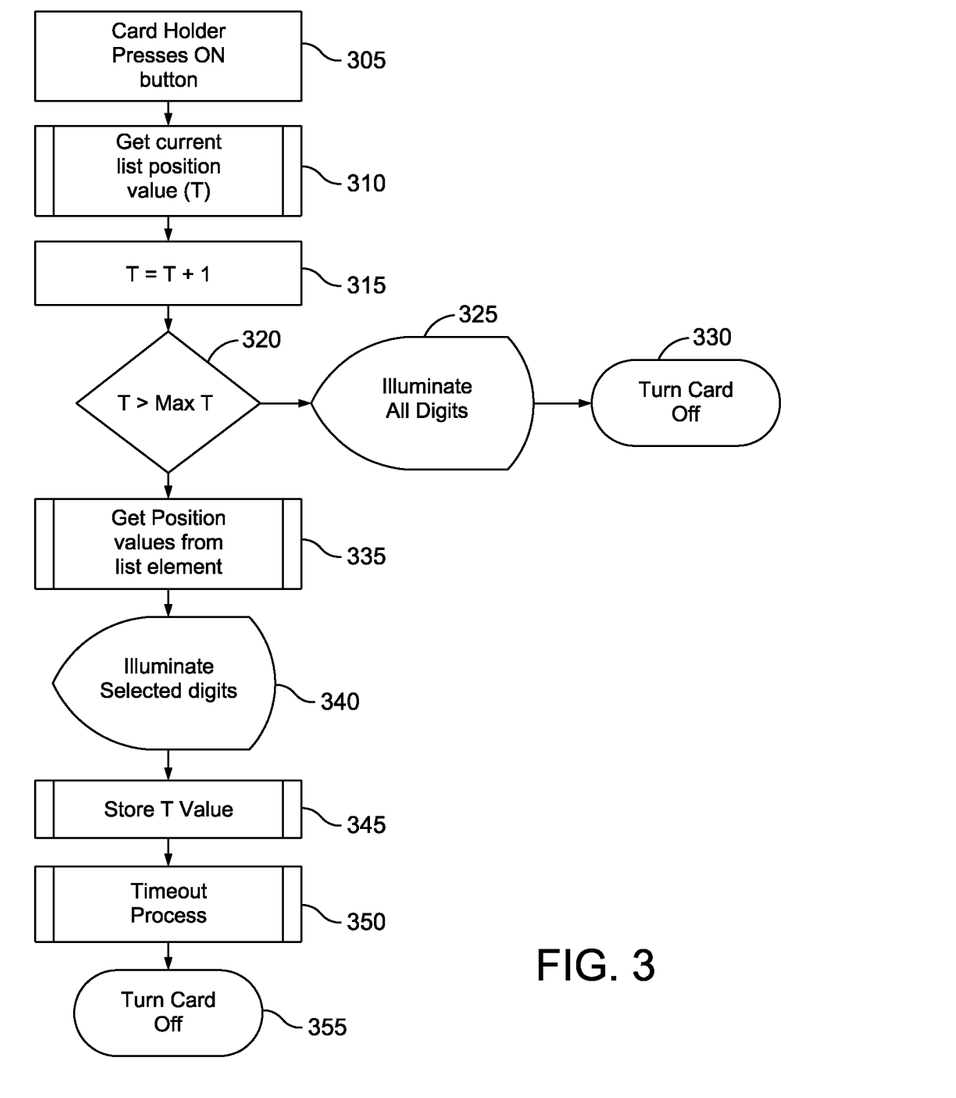
FIG. 3 is a flow diagram of an exemplary embodiment of the operation of the card of FIG. 1 or 2.

FIG. 3 is a flow chart illustrating an embodiment the operation of controller 155 (FIG. 1B) or 270 (FIG. 2B). In the embodiment of FIGS. 1A-1B, the code displayed by the LED matrix can be used for logical or physical access to a resource. In the embodiment of FIGS. 2-2E, the code displayed by the LED matrix is used for card-not-present transactions (e.g., over the phone or e-commerce transactions) or card present transactions.

Returning to FIG. 3, at step 305 the card holder turns the card on by depressing the actuation button 150 or 225.

At step 310, the controller 155 or 270 retrieves from memory a pointer "T" to an element of the list of prestored values in its memory corresponding to positions to be illuminated.

At step 315, the controller 155 or 270 increments the pointer T.

At step 320, the controller 155 or 270 checks to see if the end of the prestored list has already been reached. If the end of the list has been reached, then the controller illuminates (step 325) all of the digits in the matrix 130 or primary account number 235 at step 325 and turns the card off at step 330.

Assuming that the end of the list has not been reached, at step 335, the controller 155 or 270 retrieves the position values from the list element corresponding to the pointer value T. The position values can be any number of digits. For credit transactions the position values can be 3 or 4 digits depending on the requirements of the given card association.

At step 340, the controller 155 or 270 illuminates the LED positions/primary account number positions corresponding to the value it retrieved at step 335. The user can use the illuminated code as an OTP to access a resource or in a card-not-present or card present transaction, which can be verified by the back end system as described above.

The present value of pointer T is stored at 345.

The digits illuminated at step 340 are illuminated until a time limit expires (step 350). At that time, the card is turned off (step 355) until the next actuation by the user (step 305).

While the sub-combination of LEDs that provides a visual presentation of the one-time code (e.g., OTP or dynamic card-not-present code) is shown and described above as being illuminated simultaneously, as also noted above it is contemplated that these LEDs could be illuminated sequentially to reflect the ordering of the code. For example, the LED controller could turn on or flash a first LED corresponding to a first symbol or digit from a PAN to show the first element of the one-time code, followed by turning on or flashing a second LED (which could even be a second turn on or flash of the first LED) corresponding to a second symbol or digit from the matrix or PAN to show the second element of the one-time code, etc.

In the process of FIG. 3, it should be understood that if the card controller 155 or 270 is programmed with an algorithm for deriving the sub-combination of LEDs to illuminate, rather than use of a predefined list of sub-combinations, then steps 310 to 335 are replaced with step(s) for running the algorithm for deriving the sub-combination of LEDs. Of course, step 345 can also be eliminated.

ISO 8583 defines the common process of authorization, clearing, settlement, and funding of credit transactions. During the authorization phase, where the cardholder initiates a purchase, the Merchant passes information to the Card Issuer through the Acquirer and Card Association. The Issuer is in charge of verification and would verify any dynamic code described above passed during a card present or card-not-present transaction. A purchase approval or denial is sent back to the Merchant by way of the Card Association and Acquirer. During the batching phase, the Merchant stores approved transactions in batch form for later clearing and settlement. During the clearing and settlement phase the Merchant sends its batch to the Issuer via the Acquirer and Card Association. The Issuer bills the card holder and sends funds for payment of the debt to the Merchant via the Card Association and Acquirer.

In embodiments, the card can have biometric protection built in for locking and unlocking the card for use. The smart card controller 297 can have a match on card application stored thereon. This feature is described fully in commonly assigned PCT Application No. PCT/US09/54275, which is incorporated by reference herein as set forth above.

As discussed above, the card 100 or 200 can have a three-ply card body comprising a top graphic layer, one or more prelam/inlay electronics layer and bottom graphics layer. The graphic layer can be white with graphics printed thereon. In embodiments, the areas for illumination (e.g., the PAN number, numeric matrix 130, or areas around these items for indicating selection of a particular number, letter or symbol) are un-embossed and can be printed in white. The underlying LEDs are bright enough to shine through these white regions. Alternatively, or additionally, these areas can be finished with a laser engraving or other process to allow the internal LEDs to illuminate the individual digits. The engraving process removes or thins the layer of ink that is over the plastic base material. The central layer is a pre-laminated inlay layer having the necessary electronics thereon, e.g., microcontroller, gate arrays (CDM), voltage regulator, CDM coils, LEDs, activation switch, battery, and optional smart card ICC and contactless antenna. The bottom layer is a similar to the top layer only including an optional magnetic stripe, signature panel and/or graphics. These three layers are combined by known hot lamination techniques, which are already in use to form an overwhelming majority of all plastic cards. Compatibility with this technique offers the capacity to mass produce the cards at low costs.

Figure 4:
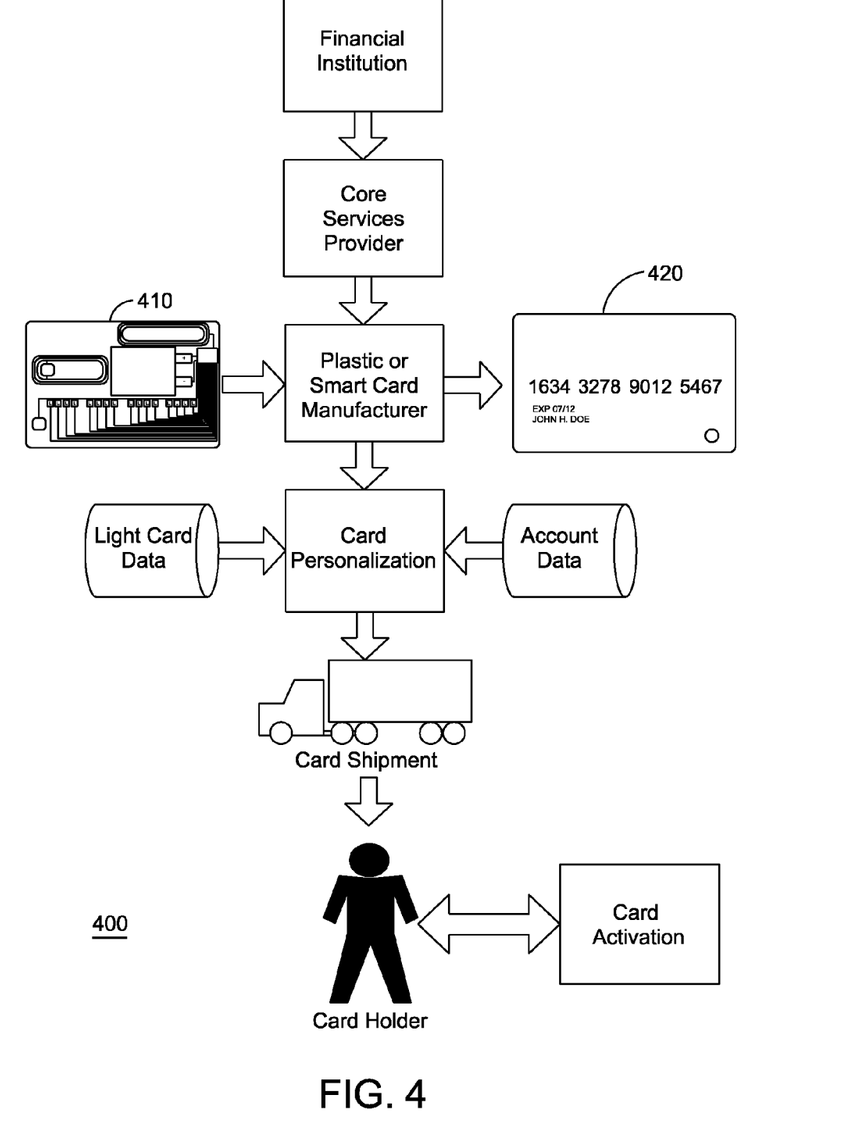
FIGS. 4 and 5 illustrate embodiments of the card issuance process.

FIG. 4 is a summary flowchart of an embodiment of a card issuing process 400 for a transaction card, such as transaction card 200. When a card account is created the Financial institution contacts a Core Services provider who handles, among other things, the ordering, distribution, and possibly activation of the plastic card.

When the process reaches the transaction card manufacturing step and the order is for a transaction card of the type described herein the manufacturer uses a transaction card inlay 410 as described above to produce a transaction card (illustrated by 420 in FIG. 4) using the above-described hot lamination manufacturing process. As part of this manufacturing process, top and bottom graphics layers would be laminated around the Prelam/Inlay electronics layer 410 at approximately 150 degrees for 15 minutes. The result of this process is a semi-finished card stock.

The card is then sent to the personalization supplier or process step (if done by the same provider) where the necessary account and other data (e.g., list of digit positions for generating one time codes or seed value(s) for use in any algorithm provided for calculating position values and the algorithm itself (if not preloaded on the microcontroller), etc.) are stored in the secure microcontroller memory (e.g., controller 155 or 270). The card can be personalized by standard contactless smart card personalization equipment and techniques. If the card has a contactless smart card chip 297 in addition to the LED controller 270, the account and other data download to the LED controller could be at the same frequency (13.56 Mhz) as the contactless smart card chip 297 but use custom command set or a separate wireless connection could be used, e.g., wireless RS-485.

The personalized card is then shipped to the Card Holder who can then proceed with the documented card activation process included with the materials accompanying the card. Typical activation methods of calling a toll free number or a simple debit card transaction to activate the card would remain the same. The card requires no special processes to activate the account.

Figure 5:
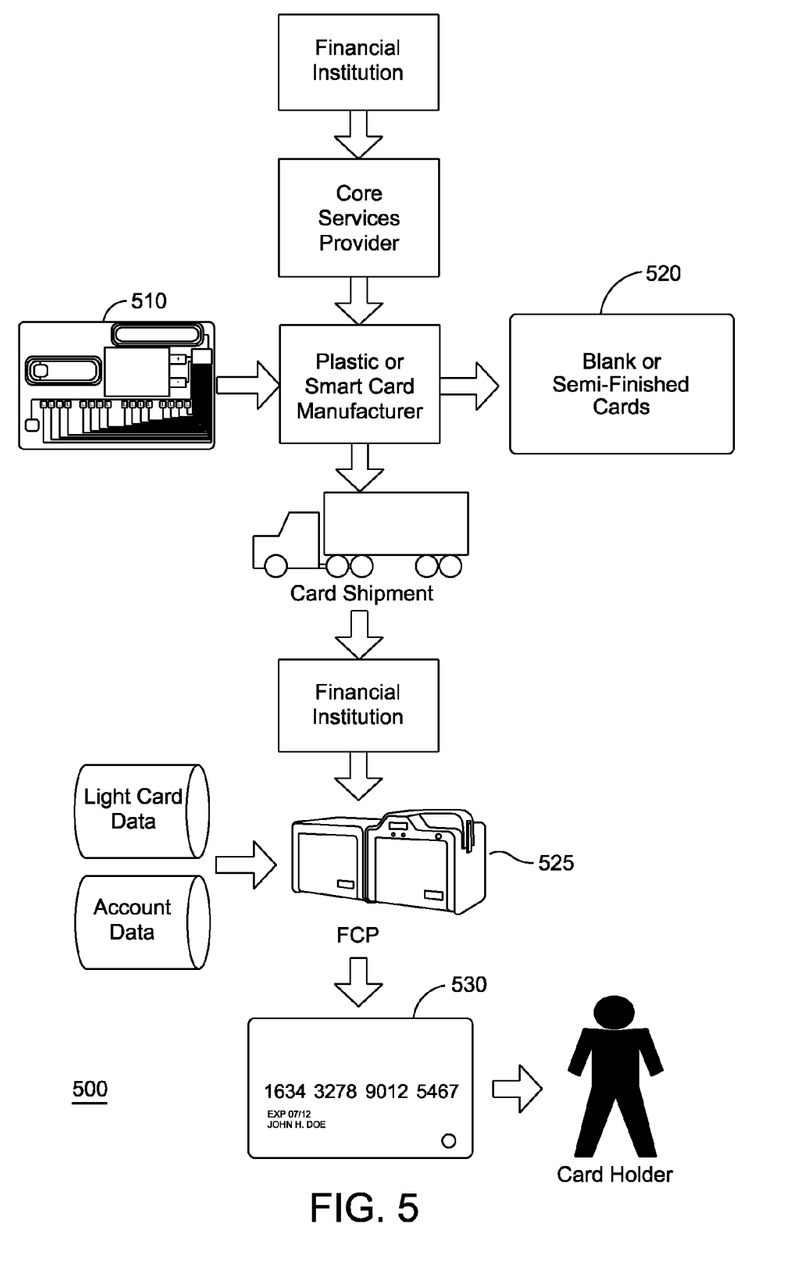

FIG. 5 is a summary flowchart of the instant issue process for a transaction card, such as a transaction card 200 described above. The process is similar to the instant issue process for current flat card (un-embossed) instant issue cards. While the process is the similar, customized personalization software would be used to provide the account information and other data to the card. The CARDWIZARD FCP 20/20 flat card printer from Dynamic Card Solutions supports contactless personalization (at 13.56 Mhz) and the custom personalization software would allow this type of flat card printer to communicate with the card to receive and store the account and other data in the secure microcontroller memory.

At the beginning of process 500, the Financial institution contacts a Core Services provider who handles, among other things, the ordering, distribution, and possibly activation of the plastic card.

When the process reaches the transaction card manufacturing step and the order is for a transaction card of the type described herein the manufacturer uses a transaction card inlay (illustrated by reference 510 in FIG. 5) as described above to produce blank transaction cards 520 using the above-described hot lamination manufacturing process. The result of this process is a semi-finished card stock. The card stock would have the logos, holograms or other security encodings and any other standard printed materials required by the card associations but lack other information, such as a printed account number and name. The blank card stock/semi-finished card stock is then shipped to the financial information, e.g., Card Issuer.

When a customer comes into the branch office of the financial institution and applies for a credit or debit account the blank card stock would be placed in the FCP machine and the top and bottom graphics would be printed along with the primary account number and other account or card holder information necessary to complete a finished credit or debit card.

The custom personalization software would store the account and other data in the secure microcontroller memory and the personalized card can then be given to the card holder for use, with or without the need to activate the card.

As described above, a plastic transaction card is provided that can provide improved security for both card present transactions (e.g., if in the dynamic code being displayed is entered during a card present transaction (similar to entering a PIN for card present debit transactions)) and card-not-present types of transactions. Use of Integrating OTP functions into a plastic card and allowing this OTP value to be included in both a card present and card-not-present transactions provide the level of security necessary to have a material effect on plastic card fraud. Having an OTP function included on a plastic card (whether financial transaction card or stand-alone OTP card) also allows the plastic card to be used as a OTP token for access control applications, an example being a web banking login.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A card for use in secure transactions, comprising:
    a card body having a front major face and a back major face, the card boy having an account number disposed on the front major face and a combination of a plurality of symbols disposed on the back major face,
    the card body having a plurality of LEDs disposed in connection with the plurality of symbols, individual ones of LEDs being disposed to identify respective individual ones of the plurality of symbols when illuminated, and
    a LED controller coupled to the plurality of LEDs, the LED controller operable to selectively illuminate individual ones of the plurality of LEDs to identity a sub-combination of the plurality of symbols, thereby illuminating one-time code for use in a secure transaction.

2. The card of claim 1, further comprising a magnetic stripe and a signature panel disposed on the back major face, wherein the plurality of symbols are aligned in a row disposed between the magnetic stripe and the signature panel.

3. The card of claim 2, wherein the card is a credit transaction card, the account number is a preprinted primary account number, the magnetic stripe is adapted for use in magnetic stripe swipe transactions with a transaction terminal configured to read transaction information encoded on a magnetic stripe of a standard transaction card, and the illuminated one-time code is a dynamic card present or card-not-present transaction code.

4. The card of claim 3, wherein the dynamic card present or card-not-present transaction code is a three or four digit code.

5. The card of claim 1, wherein the account number is a primary account number for a debit or credit financial transaction card and the illuminated one-time code is a dynamic card present or card-not-present transaction code.

6. The card of claim 1, further comprising a smart card chip programmed with at least one transaction application for use in contact and/or contactless credit or debit transactions.

7. The card of claim 1, wherein the LED controller is operable to access a stored list of LED combinations for illumination and a pointer value associated with the stored list.

8. The card of claim 1, wherein the plurality symbols is a single row of numerals containing numerals from 0 to 9.

9. The card of claim 1, wherein the LED controller is programmed to derive a combination of LEDs for illumination using a seed value.

10. The card of claim 1, wherein the one-time code has at least three code elements in sequence, wherein the LED controller is configured to illuminate the individual ones of the plurality of LEDs corresponding to the sub-combination sequentially in time starting with a first one of the code elements and finishing with a last one of the code elements.

11. The card of claim 10, wherein the symbols are arranged in a single row containing the plurality of symbols.

12. The transaction card of claim 1, further comprising an actuation trigger for manual actuation of the card, wherein the LED controller is responsive to actuation through the actuation trigger to selectively illuminate the individual ones of the plurality of LEDs to identify the sub-combination.

13. The card of claim 1, wherein the card body comprises a multiple-ply laminate card body including a top layer comprising the front major face, a bottom layer comprising the back major face, and an inlay layer comprising the plurality of LEDs and the LED controller.

14. A method of manufacturing a transaction card, comprising:
    providing an electronics inlay layer, the electronics inlay layer comprising a plurality of LEDs and an LED controller electrically connected to the plurality of LEDs; and
    laminating the electronics inlay layer between a front major face graphics layer defining a font major face of the transaction card and a back major face graphics layer defining a back major face of the card,
    wherein one of the front and back major faces has a plurality of symbols disposed thereon, wherein the plurality of LEDs are disposed relative to the plurality of symbols such that individual ones of LEDs are disposed to identify respective individual ones of the plurality of symbols when illuminated, and wherein the LED controller is operable to selectively illuminate individual ones of the plurality of LEDs to identify a sub-combination of the plurality of symbols, thereby illuminating a one-time code for use in a secure transaction.

15. The method of claim 14, wherein the front major face has an account number disposed thereon and the plurality of symbols is disposed on the back major face.

16. The method of claim 14, wherein the plurality of symbols includes an account number disposed on the front major face.

17. The method of claim 16, wherein the account number is a primary account number for a debit or credit financial transaction card and the illuminated one-time code is a dynamic card present or card-not-present transaction code.

18. The method of claim 14, wherein the electronics inlay layer further comprises a smart card chip programmed with at least one transaction application for use in contact and/or contactless credit or debit transactions.

19. The method of claim 14, wherein the LED controller is operable to access a stored list of LED combinations for illumination.

20. The method of claim 14, wherein the LED controller is programmed to derive a combination of LEDs for illumination using a seed value.

\* \* \* \* \*

UNITED STATES PATENT AND TRADEMARK OFFICE
CERTIFICATE OF CORRECTION

PATENT NO. : 8,628,017 B2
APPLICATION NO. : 13/796827
DATED : January 14, 2014
INVENTOR(S) : John Kenneth Bona, Rune Petter Domsten and Finn Nielsen Page 1 of 1

It is certified that error appears in the above-identified patent and that said Letters Patent is hereby corrected as shown below:

In the Specifications

Column 12, line 5, delete "identity" and insert therefor --identify--

Column 12, line 33, add --of-- after the word "plurality"

Signed and Sealed this
First Day of April, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,628,017 B2 |
| APPLICATION NO. | : 13/796827 |
| DATED | : January 14, 2014 |
| INVENTOR(S) | : John Kenneth Bona, Rune Petter Domsten and Finn Nielsen |

It is certified that error appears in the above-identified patent and that said Letters Patent is hereby corrected as shown below:

In the Claims

Claim 1, Column 11, line 63, delete "boy" and insert therefor --body--

Signed and Sealed this
Fifteenth Day of July, 2014

Michelle K. Lee
*Deputy Director of the United States Patent and Trademark Office*